US012597185B2

(12) United States Patent
Chen et al.

(10) Patent No.: US 12,597,185 B2
(45) Date of Patent: Apr. 7, 2026

(54) METHOD, APPARATUS, AND DEVICE FOR PROCESSING IMAGE, AND STORAGE MEDIUM

(71) Applicant: BOE Technology Group Co., Ltd., Beijing (CN)

(72) Inventors: Mingwu Chen, Beijing (CN); Xiao Chu, Beijing (CN); Weihua Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 126 days.

(21) Appl. No.: 18/286,763

(22) PCT Filed: Jan. 4, 2023

(86) PCT No.: PCT/CN2023/070280
§ 371 (c)(1),
(2) Date: Oct. 13, 2023

(87) PCT Pub. No.: WO2023/142916
PCT Pub. Date: Aug. 3, 2023

(65) Prior Publication Data
US 2024/0193831 A1     Jun. 13, 2024

(30) Foreign Application Priority Data

Jan. 29, 2022     (CN) ........................ 202210112883.X

(51) Int. Cl.
*G06T 11/00*          (2006.01)
*G06T 7/90*           (2017.01)
(Continued)

(52) U.S. Cl.
CPC ............... *G06T 11/60* (2013.01); *G06T 7/90* (2017.01); *G06V 10/56* (2022.01); *G06V 10/751* (2022.01); *G06T 2207/10024* (2013.01)

(58) Field of Classification Search
CPC ......... G06T 11/001; G06T 11/60; G06T 7/70; G06T 7/90; G06T 2207/10024;
(Continued)

(56) References Cited

U.S. PATENT DOCUMENTS

| | | | |
|---|---|---|---|
| 5,289,297 | A | 2/1994 | Bollman et al. |
| 2003/0012429 | A1 | 1/2003 | Wang |

(Continued)

FOREIGN PATENT DOCUMENTS

| | | |
|---|---|---|
| CN | 1764232 A | 4/2006 |
| CN | 102982502 A | 3/2013 |
| CN | 103915078 A | 7/2014 |
| CN | 104350535 A | 2/2015 |
| CN | 106356016 A | 1/2017 |
| CN | 112184581 A | 1/2021 |
| CN | 112966721 A | 6/2021 |
| CN | 113314079 A | 8/2021 |
| CN | 114494469 A | 5/2022 |
| WO | 02/49366 A1 | 6/2002 |

OTHER PUBLICATIONS

Liu Guang-hai et al., "Image Retrieval Based on Four Pixels Co-occurrence Matrix", Journal of Image and Graphics, vol. 13, No. 9, Sep. 2008, pp. 1783-1788; with English translation, total 17 pages.

*Primary Examiner* — Wesner Sajous
(74) *Attorney, Agent, or Firm* — XSENSUS LLP

(57)          ABSTRACT

Provided is a method for processing an image. The method comprises: determining, based on an average gray-scale value of n adjacent pixel points in a first image to be processed, a target pixel sample group from a plurality of pixel sample groups; determining, based on a gray-scale value of each of the n pixel points, a target pixel sample from at least one pixel sample in the target pixel sample group; determining, based on the target pixel sample and initial pixel values of the n pixel point, target pixel values of the n pixel points from pixel values corresponding to a plurality of alternative colors; and converting the initial pixel values of the n pixel points in the first image into corresponding target pixel values.

14 Claims, 4 Drawing Sheets

(51) Int. Cl.

| | | |
|---|---|---|
| *G06T 11/60* | (2006.01) | |
| *G06V 10/56* | (2022.01) | |
| *G06V 10/75* | (2022.01) | |
| *G09G 3/20* | (2006.01) | |
| *G09G 5/02* | (2006.01) | |
| *H04N 1/60* | (2006.01) | |
| *H04N 5/57* | (2006.01) | |

(58) Field of Classification Search
CPC ... G06T 2207/20192; G06T 2207/3024; G06T 5/20; G06T 5/70; G06T 3/407; G09G 3/20; G09G 2320/0271; G09G 2320/0276; G09G 2320/0242; G09G 2320/066; G09G 5/02; H04N 1/60; H04N 5/57–58; G06V 10/56; G06V 10/751

See application file for complete search history.

(56) References Cited

U.S. PATENT DOCUMENTS

| | | | |
|---|---|---|---|
| 2006/0083432 A1 | 4/2006 | Malvar | |
| 2013/0321477 A1* | 12/2013 | Gandhi | G09G 3/2022 |
| | | | 345/690 |
| 2014/0184655 A1* | 7/2014 | Jang | G09G 3/2003 |
| | | | 345/83 |
| 2015/0036916 A1* | 2/2015 | Mundhenk | G06T 7/593 |
| | | | 382/154 |
| 2019/0279022 A1 | 9/2019 | Chiu et al. | |

* cited by examiner

Determining, based on an average gray-scale value of n adjacent pixel points in a first image to be processed, a target pixel sample group from a plurality of pixel sample groups, wherein each of the plurality of pixel sample groups includes at least one pixel sample, each pixel sample includes n sample pixel points, average gray-scale values of pixel samples in different pixel sample groups are different, and average gray-scale values of pixel samples in one pixel sample group are the same

101

Determining, based on a gray-scale value of each of the n pixel points, a target pixel sample from at least one pixel sample in the target pixel sample group, wherein a gray-scale trend of n sample pixel points in the target pixel sample is the same as a gray-scale trend of the n pixel points

102

Determining, based on the target pixel sample and initial pixel values of the n pixel points, target pixel values of the n pixel points from pixel values corresponding to a plurality of alternative colors

103

Converting the initial pixel values of the n pixel points in the first image into corresponding target pixel values

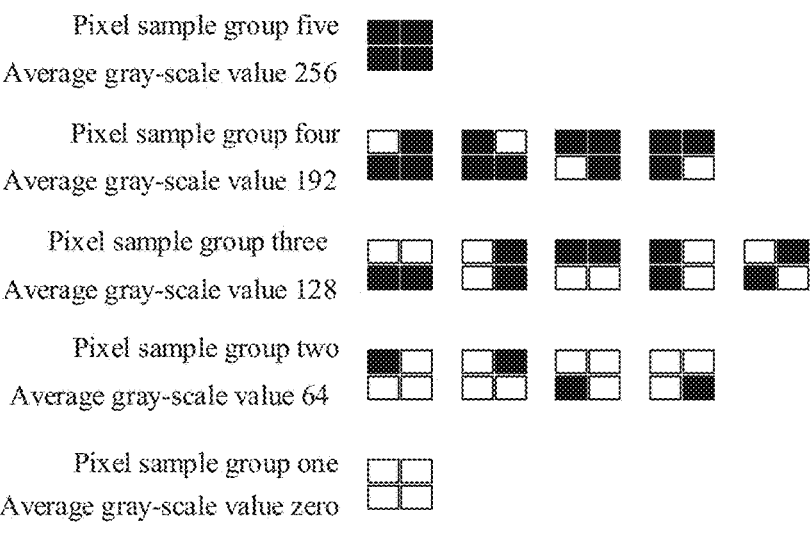

Pixel sample group five
Average gray-scale value 256

Pixel sample group four
Average gray-scale value 192

Pixel sample group three
Average gray-scale value 128

Pixel sample group two
Average gray-scale value 64

Pixel sample group one
Average gray-scale value zero

FIG. 2

METHOD, APPARATUS, AND DEVICE FOR PROCESSING IMAGE, AND STORAGE MEDIUM

CROSS-REFERENCE TO RELATED APPLICATIONS

The present disclosure a U.S. national phase application based on PCT/CN2023/070280, filed on Jan. 4, 2023, which claims the priority to Chinese Patent Application No. 202210112883.X, filed on Jan. 29, 2022 and entitled "METHOD, APPARATUS, AND DEVICE FOR PROCESSING IMAGE, AND STORAGE MEDIUM", all of which are hereby incorporated by reference in their entireties for all purposes.

TECHNICAL FIELD

The present disclosure relates to the field of image processing technologies, and in particular, relates to a method, an apparatus, and a device for processing an image, and a storage medium.

BACKGROUND

Before an electronic ink screen displays an image, the image needs to be processed to acquire an image in three colors of red, white, and black, and then the processed image is displayed. In the related art, a boundary problem exists between adjacent pixel points in the image in three colors of red, white, and black, the processed image is seriously deformed, such that content of the image cannot be clearly reflected. Therefore, how to process the image becomes a problem to be solved urgently at present.

SUMMARY

The present disclosure provides a method, an apparatus, and a device for processing an image, and a storage medium. The technical solutions are as follows.

In one aspect, a method for processing an image is provided. The method includes:

determining, based on an average gray-scale value of n adjacent pixel points in a first image to be processed, a target pixel sample group from a plurality of pixel sample groups, wherein each of the plurality of pixel sample groups includes at least one pixel sample, each pixel sample includes n sample pixel points, average gray-scale values of pixel samples in different pixel sample groups are different, and average gray-scale values of pixel samples in one pixel sample group are a same;

determining, based on a gray-scale value of each of the n pixel points, a target pixel sample from at least one pixel sample in the target pixel sample group, wherein a gray-scale trend of n sample pixel points in the target pixel sample is a same as a gray-scale trend of the n pixel points;

determining, based on the target pixel sample and initial pixel values of the n pixel points, target pixel values of the n pixel points from pixel values corresponding to a plurality of alternative colors; and converting the initial pixel values of the n pixel points in the first image into corresponding target pixel values.

In some embodiments, determining, based on the average gray-scale value of the n adjacent pixel points in the first image to be processed, the target pixel sample group from the plurality of pixel sample groups includes:

determining, from a plurality of average gray-scale ranges, a target average gray-scale range where the average gray-scale value of the n pixel points is located, wherein the plurality of average gray-scale ranges are composed of average gray-scale values corresponding to the plurality of pixel sample groups; and determining a pixel sample group corresponding to a lower limit of the target average gray-scale range as the target pixel sample group.

In some embodiments, determining, based on the average gray-scale value of the n adjacent pixel points in the first image to be processed, the target pixel sample group from the plurality of pixel sample groups includes:

determining a difference value between an average gray-scale value corresponding to each of the plurality of pixel sample groups and the average gray-scale value of the n pixel points; and determining a pixel sample group with a smallest difference value among the plurality of pixel sample groups as the target pixel sample group.

In some embodiments, the plurality of alternative colors include a first alternative color having no hue and a second alternative color having no hue, a pixel value of each of the n sample pixel points is a pixel value of the first alternative color or the second alternative color, and each of the pixel samples in the target pixel sample group corresponds to a gray-scale trend label, wherein the gray-scale trend label is configured to indicate a gray-scale trend of the n sample pixel points in the pixel sample; and determining, based on the gray-scale value of each of the n pixel points, the target pixel sample from the at least one pixel sample in the target pixel sample group includes:

acquiring a sorting result by sorting the n pixel points according to a size relation of the gray-scale values of the n pixel points;

determining, based on a first number and a second number corresponding to the target pixel sample group, a gray-scale trend label of the n pixel points according to the sorting result, wherein the first number is a number of sample pixel points of the first alternative color among the n sample pixel points, and the second number is a number of sample pixel points of the second alternative color among the n sample pixel points; and determining, from the at least one pixel sample in the target pixel sample group, a pixel sample with a gray-scale trend label same as the gray-scale trend label of the n pixel points as the target pixel sample.

In some embodiments, the plurality of alternative colors include a first alternative color having no hue and a second alternative color having no hue, and the pixel value of each of the n sample pixel points is a pixel value of the first alternative color or the second alternative color; and determining, based on the gray-scale value of each of the n pixel points, the target pixel sample from the at least one pixel sample in the target pixel sample group includes:

acquiring a sorting result by sorting the n pixel points according to a size relation of the gray-scale values of the n pixel points;

determining, based on a first number and a second number corresponding to the target pixel sample group, a color of each of the n pixel points as the first alternative color or the second alternative color according to the sorting result, wherein the first number is a number of sample pixel points of the first alternative color among the n sample pixel points, and the second number is a number of sample pixel points of the second alternative color among the n sample pixel points; and determining the target pixel sample from the at least one pixel sample in the target pixel sample group according to a color determining result of the n pixel points.

In some embodiments, the plurality of alternative colors further includes a third alternative color having a hue; and determining, based on the target pixel sample and the initial pixel values of the n pixel points, the target pixel values of the n pixel points from pixel values corresponding to the plurality of alternative colors includes:

determining, for any one of the n pixel points, whether an initial pixel value of the pixel point meets a pixel condition of the third alternative color;

determining, in a case that the initial pixel value of the pixel point meets the pixel condition of the third alternative color, a pixel value corresponding to the third alternative color as a target pixel value of the pixel point; and determining, in a case that the initial pixel value of the pixel point does not meet the pixel condition of the third alternative color, a pixel value of a sample pixel point at a corresponding position of the pixel point in the target pixel sample as the target pixel value of the pixel point.

In some embodiments, the first image includes a plurality of groups of pixel points, each group of pixel points includes n pixel points, and the method further includes:

acquiring a second image, wherein the second image includes the plurality of groups of pixel points, and an initial pixel value of each of the pixel points in the plurality of groups of pixel points in the first image is converted into a corresponding target pixel value.

In some embodiments, the n is four.

In another aspect, an apparatus for processing an image is provided. The apparatus includes:

a first determining module, configured to determine, based on an average gray-scale value of n adjacent pixel points in a first image to be processed, a target pixel sample group from a plurality of pixel sample groups, wherein each of the plurality of pixel sample groups includes at least one pixel sample, each pixel sample includes n sample pixel points, average gray-scale values of pixel samples in different pixel sample groups are different, and average gray-scale values of pixel samples in one pixel sample group are a same;

a second determining module, configured to determine, based on a gray-scale value of each of the n pixel points, a target pixel sample from at least one pixel sample in the target pixel sample group, wherein a gray-scale trend of n sample pixel points in the target pixel sample is a same as a gray-scale trend of the n pixel points;

a third determining module, configured to determine, based on the target pixel sample and initial pixel values of the n pixel points, target pixel values of the n pixel points from pixel values corresponding to a plurality of alternative colors; and a converting module, configured to convert the initial pixel values of the n pixel points in the first image into corresponding target pixel values.

In some embodiments, the first determining module is configured to:

determine, from a plurality of average gray-scale ranges, a target average gray-scale range where the average gray-scale value of the n pixel points is located, wherein the plurality of average gray-scale ranges are composed of average gray-scale values corresponding to the plurality of pixel sample groups; and determine a pixel sample group corresponding to a lower limit of the target average gray-scale range as the target pixel sample group.

In some embodiments, the first determining module is configured to:

determine a difference value between an average gray-scale value corresponding to each of the plurality of pixel sample groups and the average gray-scale value of the n pixel points; and determine a pixel sample group with a smallest difference value among the plurality of pixel sample groups as the target pixel sample group.

In some embodiments, the plurality of alternative colors include a first alternative color having no hue and a second alternative color having no hue, a pixel value of each of the n sample pixel points is a pixel value of the first alternative color or the second alternative color, and each of the pixel samples in the target pixel sample group corresponds to a gray-scale trend label, wherein the gray-scale trend label is configured to indicate a gray-scale trend of the n sample pixel points in the pixel sample; and the second determining module is specifically configured to:

acquire a sorting result by sorting the n pixel points according to a size relation of gray-scale values of the n pixel points;

determine, based on a first number and a second number corresponding to the target pixel sample group, a gray-scale trend label of the n pixel points according to the sorting result, wherein the first number is a number of sample pixel points of the first alternative color among the n sample pixel points, and the second number is a number of sample pixel points of the second alternative color among the n sample pixel points; and determine, from the at least one pixel sample in the target pixel sample group, a pixel sample with a gray-scale trend label same as the gray-scale trend label of the n pixel points as the target pixel sample.

In some embodiments, the plurality of alternative colors include a first alternative color having no hue and a second alternative color having no hue, and the pixel value of each of the n sample pixel points is a pixel value of the first alternative color or the second alternative color; and the second determining module is specifically configured to:

acquire a sorting result by sorting the n pixel points according to a size relation of the gray-scale values of the n pixel points;

determine, based on a first number and a second number corresponding to the target pixel sample group, a color of each of the n pixel points as the first alternative color or the second alternative color according to the sorting result, wherein the first number is a number of sample pixel points of the first alternative color among the n sample pixel points, and the second number is a number of sample pixel points of the second alternative color among the n sample pixel points; and determine the target pixel sample from the at least one pixel sample in the target pixel sample group according to a color determining result of the n pixel points.

5

6

In some embodiments, the plurality of alternative colors further includes a third alternative color having a hue; and the third determining module is specifically configured to:

determine, for any one of the n pixel points, whether an initial pixel value of the pixel point meets a pixel condition of the third alternative color;

determine, in a case that the initial pixel value of the pixel point meets the pixel condition of the third alternative color, a pixel value corresponding to the third alternative color as a target pixel value of the pixel point; and determine, in a case that the initial pixel value of the pixel point does not meet the pixel condition of the third alternative color, a pixel value of a sample pixel point at a corresponding position of the pixel point in the target pixel sample as the target pixel value of the pixel point.

In some embodiments, the first image includes a plurality of groups of pixel points, each group of pixel points includes n pixel points, and the apparatus further includes:

an acquiring module, configured to acquire a second image, wherein the second image includes the plurality of groups of pixel points, and an initial pixel value of each of the pixel points in the plurality of groups of pixel points in the first image is converted into a corresponding target pixel value.

In some embodiments, the n is four.

In another aspect, a device for processing an image is provided. The device for processing the image includes a memory and a processor, wherein the memory is configured to store a computer program, and the processor is configured to execute the computer program stored in the memory to perform the method for processing the image as described above.

In another aspect, a non-transitory computer-readable storage medium storing a computer program is provided. The computer program, when executed by a processor, causes the processor to perform the method for processing the image as described above.

In another aspect, a computer program product including one or more instructions is provided. The instructions, when executed on a computer, cause the computer to perform the method for processing the image as described above.

BRIEF DESCRIPTION OF THE DRAWINGS

For clearer descriptions of the technical solutions according to the embodiments of the present disclosure, the drawings to be referred to for the description of the embodiments are briefly introduced below. Apparently, the drawings in the description below merely illustrate some embodiments of the present disclosure, and those skilled in the art may also derive other drawings according to the drawings without creative efforts.

FIG. 1 is a flowchart of a method for processing an image according to some embodiments of the present disclosure;

FIG. 2 is a schematic diagram of a pixel sample group according to some embodiments of the present disclosure;

DETAILED DESCRIPTION

Figure 3:
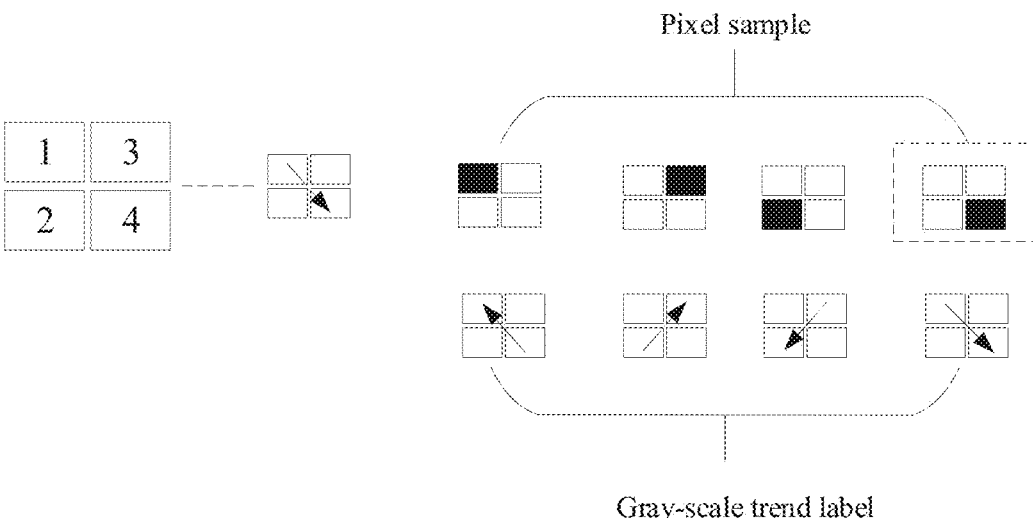
FIG. 3 is a schematic diagram of determining a target pixel sample according to some embodiments of the present disclosure.

For clearer descriptions of the objects, technical solutions, and advantages of the present disclosure, embodiments of the present disclosure are further described in detail below with reference to the drawings.

Prior to explaining a method for processing an image provided in the embodiments of the present disclosure in detail, terms and application scenarios provided in the embodiments of the present disclosure are first introduced.

For ease of understanding, the terms referred to the embodiments of the present disclosure are first explained.

Pixel point: A pixel point is composed of small squares of an image, each of the small squares has a definite position and an assigned pixel value, and the color and the position of the small square determine the appearance of the image.

RGB color space: RGB color space is a color standard in the industry, which obtains various colors by changing three components of red (R), green (G), and Blue (B) and superimposing them with each other, wherein RGB is a color representing three components of red, green, and blue, and the standard includes almost all colors perceived by human vision, and is one of the most widely used color space.

Gray scale: Black tone is used to represent an object, that is, black is a reference color, and black with different saturation is used to display an image.

Next, application scenarios referred in the embodiments of the present disclosure are described.

The method for processing the image provided in the embodiments of the present disclosure is applicable to various scenarios. For example, in a scenario of displaying an image on an electronic ink screen, a first image in color is usually converted into a second image in three colors of red, white, and black, to display the second image. However, in a process of processing the first image, as a boundary problem exists between adjacent pixel points in the image in three colors of red, white, and black, the processed second image is seriously deformed, and image content cannot be clearly reflected. Therefore, by the method for processing the image provided in the embodiments of the present disclosure, the first image to be processed is processed to acquire the second image. Therefore, the boundary problem of the n pixel points is improved, and the processed second image presents a gradual change effect visually.

The method for processing the image provided in the embodiments of the present disclosure is performed by using a device for processing an image, and the device for processing the image is a terminal device such as a fixed terminal, and a mobile terminal. The terminal device is any electronic product capable of performing human-computer interaction with a user through one or more modes such as a keyboard, a touch pad, a touch screen, a remote controller, a voice interaction, or a handwriting device, for example, a personal computer (PC), a mobile phone, a smart phone, a personal digital assistant (PDA), a pocket PC, a tablet computer.

Those skilled in the art should understand that the above application scenarios and the device for processing the image are only examples, and other existing or future application scenarios and the device for processing the image applicable to the embodiments of the present disclosure are also in the protection scope of the embodiments of the present disclosure and are hereby incorporated by reference.

It should be noted that the application scenarios described in the embodiments of the present disclosure are intended to describe the technical solutions in the embodiments of the present disclosure more clearly, but do not constitute a limitation on the technical solutions provided in the embodiments of the present disclosure. Those of ordinary skilled in the art learn that the technical solutions provided in the embodiments of the present disclosure are also applicable to similar technical problems.

The method for processing the image provided in the embodiments of the present disclosure is explained in detail as follows.

FIG. 1 is a flowchart of a method for processing an image according to some embodiments of the present disclosure. Referring to FIG. 1, the method includes the following steps.

In step 101, a target pixel sample group is determined from a plurality of pixel sample groups based on an average gray-scale value of n adjacent pixel points in a first image to be processed, wherein each of the plurality of pixel sample groups includes at least one pixel sample, each pixel sample includes n sample pixel points, average gray-scale values of pixel samples in different pixel sample groups are different, and average gray-scale values of pixel samples in one pixel sample group are the same.

An execution subject of the embodiments of the present disclosure is a terminal device such as a fixed terminal, or a mobile terminal, and for ease of description, the mobile terminal is taken as an example to be introduced as follows.

The mobile terminal determines the gray-scale value of each of the n adjacent pixel points in the first image to be processed and determines the average gray-scale value of the n pixel points. Then, a target pixel sample group is determined from the plurality of pixel sample groups based on the average gray-scale value of the n pixel points.

As an example, the mobile terminal determines the gray-scale value of any one of the n pixel points according to the following formula (1).

$$\text{gray} = \frac{(R + G + B)}{3} \qquad (1)$$

In the formula (1), gray represents a gray-scale value of the pixel point, R represents an R component of an initial pixel value of the pixel point, G represents a G component of the initial pixel value of the pixel point, and B represents a B component of the initial pixel value of the pixel point.

In some embodiments, prior to processing the first image, the mobile terminal further needs to load a folder where the first image is located to acquire a storage path of the first image. The mobile terminal acquires the first image based on the storage path of the first image. In addition, the mobile terminal further acquires the first image in other manners.

After acquiring the first image, the mobile terminal further acquires a pixel width and a pixel height of the first image, and an R component, a G component, and a B component of an initial pixel value of each of the pixel points in the first image, wherein the pixel width refers to the number of pixel points in the first image in a width direction, and the pixel height refers to the number of pixel points in the first image in a height direction. In addition, the mobile terminal further acquires other data, for example, in the case that the first image is in a PNG format, the mobile terminal further acquires transparency of the first image.

As an example, the mobile terminal creates a three-dimensional array for the first image, the three-dimensional array includes a width array, a height array, and an RGB three-dimensional array. The width array includes the pixel width of the first image, the height array includes the pixel height of the first image, and the RGB three-dimensional array includes the R component, the G component, and the B component of the initial pixel value of each of the pixel points in the first image. In the case that the first image is in the PNG format, the RGB three-dimensional array further includes the transparency of the first image. In this case, the length of the RGB three-dimensional array of the first image is four.

Generally, the pixel value of each of pixel points in an image is a negative integer. Therefore, after acquiring the first image, the mobile terminal determines the R component, the G component, and the B component of the initial pixel value of each of the pixel points in the first image according to the following formula (2).

$$R = (\text{pixel} \& 0xff0000) \gg 16$$

$$G = (\text{pixel} \& 0xff00) \gg 8$$

$$B = (\text{pixel} \& 0xff)) \qquad (2)$$

In the formula (2), R represents an R component of an initial pixel value of any one of the pixel points in the first image, G represents a G component of the initial pixel value of the pixel point, and B represents a B component of the initial pixel value of the pixel point, and pixel represents a pixel value of the pixel point.

In the process of acquiring the pixel value of each of the pixel points in the first image, to determine a position of each of the pixel points, the mobile terminal further establishes a coordinate system by taking a certain pixel point in the first image as an origin point to determine a position coordinate of each of the pixel points in the first image, wherein the position coordinate of each of the pixel points in the first image is based on the pixel point.

It should be noted that a value of the n is an integer greater than or equal to three, and the n is represented as N×M. Both N and M are positive integers, and a difference value between the N and the M is not greater than a threshold value. That is, for any n pixel points in the first image that meet the above conditions, the mobile terminal determines the average gray-scale value of the n pixel points according to the above method, and then determines the target pixel sample group from the plurality of pixel sample groups. For example, n is four, and both N and M are two. Alternatively, n is six, N is two and M is three. As another example, n is nine, and both N and M are three.

The threshold value is configured to limit the relationship between N and M. In the case that a difference value between N and M is greater than the threshold value, a difference between the number of pixel points in the width direction and the number of pixel points in the height direction of the n adjacent pixel points in the first image is large, such that the processed second image cannot clearly reflect image content. Therefore, the threshold value is usually small, and it is ensured that the difference between the number of the pixel points in the width direction and the number of the pixel points in the height direction of the n pixel points is small, such that the processed second image clearly reflects the image content of the first image.

After determining the average gray-scale value of the n pixel points according to the above method, the mobile terminal determines the target pixel sample group from the plurality of pixel sample groups based on the average gray-scale value of the n pixel points. That is, the mobile terminal determines a target average gray-scale range where the average gray-scale value of the n pixel points is located from a plurality of average gray-scale ranges, the plurality of average gray-scale ranges are composed of the average gray-scale values corresponding to the plurality of pixel sample groups, and a pixel sample group corresponding to a lower limit of the target average gray-scale range is determined as a target pixel sample group.

The mobile terminal stores a plurality of pixel sample groups, and the plurality of pixel sample groups are in one-to-one correspondence with a plurality of average gray-scale values. That is, different pixel sample groups correspond to different average gray-scale values. Two adjacent average gray-scale values in the plurality of average gray-scale values form an average gray-scale range, a smallest value of the two adjacent average gray-scale values serves as a lower limit of the average gray-scale range, and a largest value of the two adjacent average gray-scale values serves as an upper limit of the average gray-scale range. Therefore, after determining the average gray-scale value of the n pixel points, the mobile terminal matches the average gray-scale value of the n pixel points with the plurality of average gray-scale ranges, to determine the average gray-scale range where the average gray-scale value of the n pixel points is located, and determine the average gray-scale range as the target average gray-scale range. Then, the pixel sample group corresponding to the lower limit of the target average gray-scale range is determined as the target pixel sample group.

Exemplarily, referring to FIG. 2, FIG. 2 is a schematic diagram of a pixel sample group according to some embodiments of the present disclosure. In FIG. 2, take n is four as an example, that is, both N and M are two. The mobile terminal stores five pixel sample groups, and average gray-scale values of the five pixel sample groups are 0, 64, 128, 192, and 256, respectively. Four average gray-scale ranges composed of the five pixel sample groups are [0-64), [64-128), [128-192), and [192-256]. Assuming that an average gray-scale value of four adjacent pixel points in the first image is determined to be 60 by the mobile terminal, and an average gray-scale range where the average gray-scale value 60 of the four pixel points is located is [0-64), the average gray-scale range of [0-64) is determined as a target average gray-scale range. Then, a pixel sample group one corresponding to a lower limit zero of the target average gray-scale range [0-64) is determined as a target pixel sample group.

After determining the target average gray-scale range where the average gray-scale value of the n pixel points is located, the mobile terminal directly determines the pixel sample group corresponding to the lower limit of the target average gray-scale range as the target pixel sample group without performing other operations, such that an operation process is simplified and operation speed is increased. However, in the case that the average gray-scale value of the n pixel points is closer to an upper limit of the target average gray-scale range, there is a certain error in directly determining the pixel sample group corresponding to the lower limit of the target average gray-scale range as the target pixel sample group. In view of the problem, in the embodiments of the present disclosure, to enable the processed second image to accurately reflect the image content of the first image, a value of the n is usually not very large, and therefore, an error generated by the n pixel points is substantially negligible.

The above manner of determining the target pixel sample group is an example. In other embodiments, the mobile terminal determines the target pixel sample group in other manners. Exemplarily, the mobile terminal determines a difference value between an average gray-scale value corresponding to each of the plurality of pixel sample groups and an average gray-scale value of the n pixel points, and determines a pixel sample group with a minimum difference value among the plurality of pixel sample groups as a target pixel sample group.

The mobile terminal stores a plurality of pixel sample groups, and the plurality of pixel sample groups are in one-to-one correspondence with a plurality of average gray-scale values. That is, different pixel sample groups correspond to different average gray-scale values. After determining the average gray-scale value of the n pixel points, the mobile terminal determines the difference value between the average gray-scale value corresponding to each of the plurality of pixel sample groups and the average gray-scale value of the n pixel points, and determines a pixel sample group with a smallest difference value among the plurality of pixel sample groups as the target pixel sample group.

Exemplarily, take n is four as an example, that is, both N and M are two. The mobile terminal stores five pixel sample groups, and average gray-scale values of the five pixel sample groups are 0, 64, 128, 192, and 256, respectively. Assuming that the mobile terminal determines that an average gray-scale value of four adjacent pixel points in the first image is 60, and in this case, a difference value between an average gray-scale value 64 corresponding to a pixel sample group two in the five pixel sample groups and an average gray-scale value 60 of the four pixel points is the smallest and only four, then the pixel sample group two is determined as a target pixel sample group.

The mobile terminal determines a pixel sample group with a smallest difference value as a target pixel sample group by determining a difference value between an average gray-scale value corresponding to each of the pixel sample groups and the average gray-scale value of the n pixel points. Although an operation of determining a difference value between average gray-scale values is added, the target pixel sample group is accurately determined from the plurality of pixel sample groups to reduce the error and improve the display effect of the second image.

In some embodiments, storage space of the mobile terminal includes an image information extracting area and an image buffering area. A process that the mobile terminal acquires a storage path of the first image and a three-dimensional array corresponding to the first image is completed in the image information extracting area. A process of the mobile terminal determining the target pixel sample group from the plurality of pixel sample groups is completed in the image buffering area. That is, the mobile terminal performs a process of acquiring the storage path and the corresponding three-dimensional array of the first image in the image information extracting area, and performs a process of converting the first image into the second image in the image buffering area. Exemplarily, the mobile terminal processes the first image in the image buffering area via a tool for processing an image Graphics2D provided in a Java development language to acquire the second image. The tool Graphics2D for processing an image provided by the Java development language is the same for different images to be processed.

In step 102, a target pixel sample is determined from at least one pixel sample in the target pixel sample group based on a gray-scale value of each of the n pixel points, wherein a gray-scale trend of n sample pixel points in the target pixel sample is the same as a gray-scale trend of the n pixel points.

The plurality of alternative colors include a first alternative color having no hue and a second alternative color having no hue, a pixel value of each of the n sample pixel points is a pixel value of the first alternative color or the second alternative color, and each of the pixel samples in the target pixel sample group corresponds to a gray-scale trend label, wherein the gray-scale trend label is configured to indicate a gray-scale trend of the n sample pixel points in the pixel sample.

The gray-scale value of the first alternative color and the gray-scale value of the second alternative color have a size relation, such that the gray-scale trend label corresponding to the pixel sample is configured to indicate a trend of the size relation of the gray-scale values of the n sample pixel points in the pixel sample. The trend of the size relation of the gray-scale values of the n sample pixel points is a trend of the gray-scale values of the n sample pixel points from small to large. In addition, the trend of the size relationship between the gray-scale values of the n sample pixel points is also the trend of the gray-scale values of the n sample pixel points from large to small, which is not limited in the embodiments of the present disclosure.

For example, the first alternative color is black and the second alternative color is white. The gray-scale value of black is zero, the gray-scale value of white is 255, and the gray-scale value of black is less than the gray-scale value of white. The gray-scale trend label corresponding to the pixel sample is configured to indicate a trend of the color of the n sample pixel points in the pixel sample from black to white, and is further configured to indicate a trend of the color of the n sample pixel points from white to black.

In some embodiments, the mobile terminal acquires a sorting result by sorting the n pixel points according to the size relation of the gray-scale values of the n pixel points. A gray-scale trend label of the n pixel points is determined according to the sorting result based on a first number and a second number corresponding to the target pixel sample group, wherein the first number is a number of sample pixel points of the first alternative color among the n sample pixel points, and the second number is a number of sample pixel points of the second alternative color among the n sample pixel points. A pixel sample with a gray-scale trend label same as the gray-scale trend label of the n pixel points is determined, from the at least one pixel sample in the target pixel sample group, as the target pixel sample.

As the gray-scale trend label indicates the trend of the gray-scale values of the n sample pixel points from large to small, and further indicates the trend of the gray-scale values of the n sample pixel points from small to large, under different conditions, processes of the mobile terminal determining the target pixel sample from at least one pixel sample in the target pixel sample group are different, and therefore, the following two conditions are divided to be described, respectively.

In the first case, the gray-scale trend label is configured to indicate a trend of the gray-scale values of the n sample pixel points from large to small. In this case, the mobile terminal sorts the n pixel points according to the size relation of the gray-scale values of the n pixel points from large to small to acquire the sorting result. In the case that the gray-scale value of the first alternative color is greater than the gray-scale value of the second alternative color, according to the sorting result, the gray-scale trend label of the n pixel points is drawn from positions of the first number of pixel points ranked higher among the n pixel points to positions of other pixel points. In the case that the gray-scale value of the first alternative color is less than the gray-scale value of the second alternative color, according to the sorting result, the gray-scale trend label of the n pixel points is drawn from positions of the second number of pixel points ranked higher among the n pixel points to positions of other pixel points. Then, a pixel sample with a gray-scale trend label same as the gray-scale trend label of the n pixel points is determined, from the at least one pixel sample in the target pixel sample group, as the target pixel sample.

It should be noted that, in the case that the first number corresponding to the target pixel sample group is n and the second number is zero, it indicates that the target pixel sample group includes one pixel sample, and pixel values of n sample pixel points in the pixel sample are pixel values of the first alternative color. In this case, the n pixel points do not have the gray-scale trend, such that the pixel sample in the target pixel sample group is directly determined as the target pixel sample. Similarly, in the case that the second number corresponding to the target pixel sample group is n and the first number is zero, it indicates that the target pixel sample group includes one pixel sample, and pixel values of n sample pixel points in the pixel sample are pixel values of the second alternative color. In this case, the n pixel points do not have the gray-scale trend, such that the pixel sample in the target pixel sample group is directly determined as the target pixel sample.

Exemplarily, referring to FIG. 3, FIG. 3 is a schematic diagram of determining a target pixel sample according to some embodiments of the present disclosure. In FIG. 3, assuming that n is four, the first alternative color is black, the second alternative color is white, a gray-scale value of black is zero, a gray-scale value of white is 255, and the gray-scale value of black is less than the gray-scale value of white. Assuming that the mobile terminal determines the pixel sample group two in FIG. 2 as a target pixel sample group, and a gray-scale trend label of four pixel samples in the target pixel sample group is as shown in a right diagram of FIG. 3. The first number is one and the second number is three for the target pixel sample group. The mobile terminal sorts the four pixel points according to the size relation of gray-scale values of the four adjacent pixel points in the first image from large to small, and the pixel point with the largest gray-scale value among the four pixel points is sorted into 1, the pixel point with the smallest gray-scale value among the four pixel points is sorted into 4, and the acquired sorting result is shown in a left diagram of FIG. 3. According to the sorting result, the gray-scale trend label of the four pixel points is drawn from positions of three pixel points ranked higher among the four pixel points to a position of the remaining pixel point, and the drawn gray-scale trend label is shown in a middle diagram of FIG. 3. Then, the gray-scale trend label of the four pixel points is compared with a gray-scale trend label of four pixel samples in the target pixel sample group, and a pixel sample in a dashed line frame in the right diagram of FIG. 3 is determined as the target pixel sample.

Based on the above description, average gray-scale values of pixel samples in different pixel sample groups are different, and average gray-scale values of pixel samples in the same pixel sample group are the same. Moreover, each of the pixel samples includes n sample pixel points, and the pixel value of each of the n sample pixel points is the pixel value of the first alternative color or the second alternative color.

As the average gray-scale value of the pixel samples is determined based on the gray-scale value of each of the n sample pixel points in the pixel samples, the first number and the second number of the pixel samples in the same pixel sample group are the same under the condition that the average gray-scale values of the pixel samples in the same pixel sample group are the same. Therefore, one pixel sample group has one first number and one second number. That is, each of the plurality of pixel sample groups has one first number and one second number.

In the second case, the gray-scale trend label is configured to indicate a trend of the gray-scale values of the n sample pixel points from small to large. In this case, the mobile terminal sorts the n pixel points according to the size relation of the gray-scale values of the n pixel points from small to large to acquire the sorting result. In the case that the gray-scale value of the first alternative color is greater than the gray-scale value of the second alternative color, according to the sorting result, the gray-scale trend label of the n pixel points is drawn from positions of the second number of pixel points ranked higher among the n pixel points to positions of other pixel points. In the case that the gray-scale value of the first alternative color is less than the gray-scale value of the second alternative color, according to the sorting result, the gray-scale trend label of the n pixel points is drawn from positions of the first number of pixel points ranked higher among the n pixel points to positions of other pixel points. Then, a pixel sample with a gray-scale trend label same as the gray-scale trend label of the n pixel points is determined, from the at least one pixel sample in the target pixel sample group, as the target pixel sample.

It should be noted that, in the case that the first number corresponding to the target pixel sample group is n and the second number is zero, it indicates that the target pixel sample group includes one pixel sample, and pixel values of n sample pixel points in the pixel sample are pixel values of the first alternative color. In this case, the n pixel points do not have the gray-scale trend, such that the pixel sample in the target pixel sample group is directly determined as the target pixel sample. Similarly, in the case that the second number corresponding to the target pixel sample group is n and the first number is zero, it indicates that the target pixel sample group includes one pixel sample, and pixel values of n sample pixel points in the pixel sample are pixel values of the second alternative color. In this case, the n pixel points do not have the gray-scale trend, such that the pixel sample in the target pixel sample group is directly determined as the target pixel sample.

Figure 4:
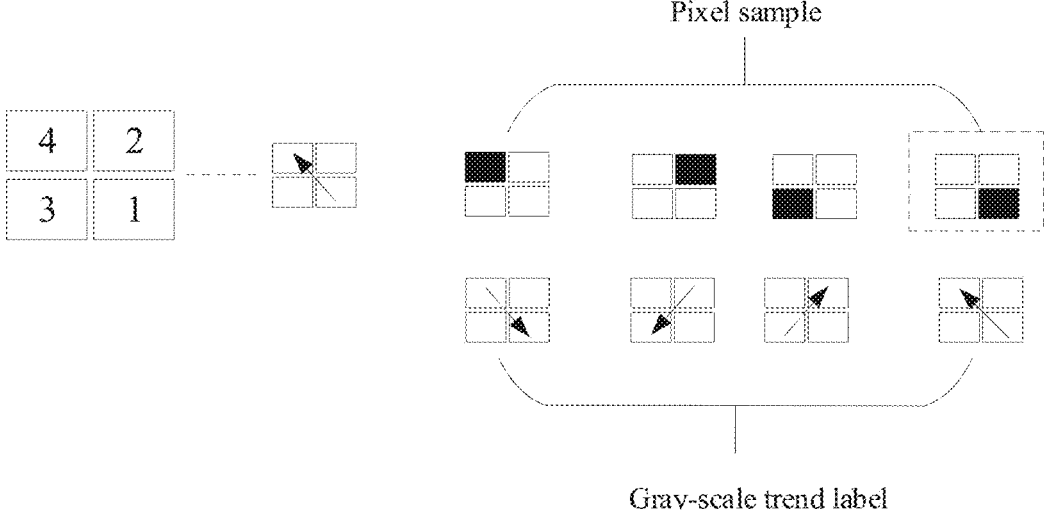
FIG. 4 is another schematic diagram of determining a target pixel sample according to some embodiments of the present disclosure.

Exemplarily, referring to FIG. 4, FIG. 4 is another schematic diagram of determining a target pixel sample according to some embodiments of the present disclosure. In FIG. 4, assuming that n is four, the first alternative color is black, the second alternative color is white, a gray-scale value of black is zero, a gray-scale value of white is 255, and the gray-scale value of black is less than the gray-scale value of white. Assuming that the mobile terminal determines the pixel sample group two in FIG. 2 as a target pixel sample group, and a gray-scale trend label of four pixel samples in the target pixel sample group is as shown in a right diagram of FIG. 4. The first number is one and the second number is three for the target pixel sample group. The mobile terminal sorts the four pixel points according to the size relation of gray-scale values of the four adjacent pixel points in the first image from small to large, and the pixel point with the smallest gray-scale value among the four pixel points is sorted into 1, the pixel point with the largest gray-scale value among the four pixel points is sorted into 4, and the sorting result is shown in a left diagram of FIG. 4. According to the sorting result, the gray-scale trend label of the four pixel points is drawn from a position of one pixel point ranked higher among the four pixel points to positions of the remaining three pixel points, and the drawn gray-scale trend label of the four pixel points is shown in a middle diagram of FIG. 4. Then, the gray-scale trend label of the four pixel points is compared with a gray-scale trend label of four pixel samples in the target pixel sample group, and a pixel sample in a dashed line frame in the right diagram of FIG. 4 is determined as the target pixel sample.

In the above two cases, the mobile terminal determines, from the at least one pixel sample in the target pixel sample group, a pixel sample with a gray-scale trend label same as the gray-scale trend label of the n pixel points as the target pixel sample, such that the gray between the target pixel values of the n pixel points has a certain trend. In this way, a boundary problem of the n pixel points in the second image is improved, and the second image presents a gradual change effect visually.

It should be noted that, in the above two cases, the trend of the gray-scale values of the n sample pixel points is consistent with the size relation of the gray-scale values of the n pixel points. That is, in the case that the gray-scale trend label is configured to indicate a trend of the gray-scale values of the n sample pixel points from large to small, the mobile terminal sorts the n pixel points according to the size relation of the gray-scale values of the n pixel points from large to small. In the case that the gray-scale trend label is configured to indicate a trend of the gray-scale values of the n sample pixel points from small to large, the mobile terminal sorts the n pixel points according to the size relation of the gray-scale values of the n pixel points from small to large. In addition, the trend of the gray-scale values of the n sample pixel points and the size relation of the gray-scale values of the n pixel points also are inconsistent. That is, in the case that the gray-scale trend label is configured to indicate a trend of the gray-scale values of the n sample pixel points from large to small, the mobile terminal sorts the n pixel points according to the size relation of the gray-scale values of the n pixel points from small to large. In the case that the gray-scale trend label is configured to indicate a trend of the gray-scale values of the n sample pixel points from small to large, the mobile terminal sorts the n pixel points according to the size relation of the gray-scale values of the n pixel points from large to small.

The above manner of determining the target pixel sample is an example. In other embodiments, the mobile terminal further determines the target pixel sample in other manners. Exemplarily, the mobile terminal sorts the n pixel points according to the size relation of the gray-scale values of the n pixel points to acquire a sorting result; determines, based on a first number and a second number corresponding to the target pixel sample group, a color of each of the n pixel points as the first alternative color or the second alternative color according to the sorting result, wherein the first number is a number of sample pixel points of the first alternative color among the n sample pixel points, and the second number is a number of sample pixel points of the second alternative color among the n sample pixel points; and determines the target pixel sample from the at least one pixel sample in the target pixel sample group according to a color determining result of the n pixel points.

As the mobile terminals sorts the n pixel points according to the size relation of the gray-scale values of the n pixel points from large to small, and further sorts the n pixel points according to the size relation of the gray-scale values of the n pixel points from small to large, under different conditions, processes of the mobile terminal determining the target pixel sample from at least one pixel sample in the target pixel sample group are different, and therefore, the following two conditions are divided to be described, respectively.

In the first case, the mobile terminal sorts the n pixel points according to the size relation of the gray-scale values of the n pixel points from large to small, to acquire the sorting result. In the case that the gray-scale value of the first alternative color is greater than the gray-scale value of the second alternative color, according to the sorting result, the color of the first number of pixel points ranked higher among the n pixel points is determined as the first alternative color, and the color of other pixel points as the second alternative color. In the case that the gray-scale value of the first alternative color is less than the gray-scale value of the second alternative color, according to the sorting result, the color of the second number of pixel points ranked higher among the n pixel points is determined as the second alternative color, and the color of other pixel points as the first alternative color. Then, the target pixel sample is determined from the at least one pixel sample in the target pixel sample group according to a color determining result of the n pixel points.

It should be noted that, in the case that the first number corresponding to the target pixel sample group is n and the second number is zero, it indicates that the target pixel sample group includes one pixel sample, and the color of each of n sample pixel points in the pixel sample is the first alternative color. In this case, the pixel sample in the target pixel sample group is directly determined as the target pixel sample. Similarly, in the case that the second number corresponding to the target pixel sample group is n and the first number is zero, it indicates that the target pixel sample group includes one pixel sample, and the color of each of n sample pixel points in the pixel sample is the second alternative color. In this case, the pixel sample in the target pixel sample group is directly determined as the target pixel sample.

For example, assuming that n is four, the first alternative color is black, the second alternative color is white, a gray-scale value of black is zero, a gray-scale value of white is 255, and the gray-scale value of black is less than the gray-scale value of white. Assuming that the mobile terminal determines the pixel sample group two in FIG. 2 as a target pixel sample group, and the first number is one and the second number is three for the pixel sample group two. The mobile terminal sorts the four pixel points according to the size relation of gray-scale values of the four pixel points from large to small, and according to the sorting result, the color of the three pixel points ranked higher among the four pixel points is determined as white, and the color of the remaining pixel point as black. Then, the pixel samples in the pixel sample group two are compared to determine the target pixel sample.

In the second case, the mobile terminal sorts the n pixel points according to the size relation of the gray-scale values of the n pixel points from small to large, to acquire the sorting result. In the case that the gray-scale value of the first alternative color is greater than the gray-scale value of the second alternative color, according to the sorting result, the color of the second number of pixel points ranked higher among the n pixel points is determined as the second alternative color, and the color of the remaining pixel point as the first alternative color. In the case that the gray-scale value of the first alternative color is less than the gray-scale value of the second alternative color, according to the sorting result, the color of the first number of pixel points ranked higher among the n pixel points is determined as the first alternative color, and the color of the remaining pixel points as the second alternative color. Then, the target pixel sample is determined from the at least one pixel sample in the target pixel sample group according to a color determining result of the n pixel points.

It should be noted that, in the case that the first number corresponding to the target pixel sample group is n and the second number is zero, it indicates that the target pixel sample group includes one pixel sample, and the color of each of n sample pixel points in the pixel sample is the first alternative color. In this case, the pixel sample in the target pixel sample group is directly determined as the target pixel sample. Similarly, in the case that the second number corresponding to the target pixel sample group is n and the first number is zero, it indicates that the target pixel sample group includes one pixel sample, and the color of each of n sample pixel points in the pixel sample is the second alternative color. In this case, the pixel sample in the target pixel sample group is directly determined as the target pixel sample.

For example, assuming that n is four, the first alternative color is black, the second alternative color is white, a gray-scale value of black is zero, a gray-scale value of white is 255, and the gray-scale value of black is less than the gray-scale value of white. Assuming that the mobile terminal determines the pixel sample group two as a target pixel sample group, and the first number is one and the second number is three for the pixel sample group two. The mobile terminal sorts the four pixel points according to the size relation of gray-scale values of the four pixel points from small to large, and according to the sorting result, the color of the one pixel point ranked higher among the four pixel points is determined as black, and the color of the remaining pixel points as white. Then, the pixel samples in the pixel sample group two are compared to determine the target pixel sample.

Based on the above description, in the pixel sample, the pixel value of each of the n sample pixel points is the pixel value of the first alternative color or the second alternative color. Therefore, in the above two cases, a color determining result of the n pixel points is acquired by determining whether the color of each of the n pixel points is the first alternative color or the second alternative color, and the target pixel sample is accurately determined from at least one pixel sample in the target pixel sample group.

In step 103, target pixel values of the n pixel points are determined from pixel values corresponding to a plurality of alternative colors based on the target pixel sample and initial pixel values of the n pixel points.

The plurality of alternative colors further includes a third alternative color having a hue. For any one of the n pixel points, whether an initial pixel value of the pixel point meets a pixel condition of the third alternative color is determined; in the case that the initial pixel value of the pixel point meets the pixel condition of the third alternative color, a pixel value corresponding to the third alternative color is determined as a target pixel value of the pixel point; and in the case that the initial pixel value of the pixel point does not meet the pixel condition of the third alternative color, a pixel value of a sample pixel point at a corresponding position of the pixel point in the target pixel sample is determined as a target pixel value of the pixel point.

As the pixel condition of the third alternative color is configured to determine whether the color of the pixel point belongs to the third alternative color, and in the case that the initial pixel value of the pixel point meets the pixel condition of the third alternative color, it is indicated that the color of the pixel point belongs to the third alternative color. Therefore, the pixel value corresponding to the third alternative color is determined as the target pixel value of the pixel point. In the case that the initial pixel value of the pixel point does not meet the pixel condition of the third alternative color, it is indicated that the color of the pixel point does not belong to the third alternative color. In the case that the color of the pixel point does not belong to the third alternative color, the plurality of alternative colors further include the first alternative color and the second alternative color in addition to the third alternative color, and the pixel value of each of the sample pixel points in the target pixel sample is the pixel value of the first alternative color or the second alternative color. Therefore, a pixel value of a sample pixel point at a corresponding position of the pixel point in the target pixel sample is determined as a target pixel value of the pixel point.

As the first alternative color and the second alternative color have no hues, the gray-scale value of the first alternative color and the gray-scale value of the second alternative color have a size relation, and the third alternative color has a hue, the gray-scale value of the third alternative color is located between the gray-scale value of the first alternative color and the gray-scale value of the second alternative color. In addition, as the gray-scale values of the n sample pixel points in the target pixel sample have a trend of the size relation, in the case that an initial pixel value of a certain pixel point meets the pixel condition of the third alternative color, it indicates that the gray-scale value of the pixel point is located between the gray-scale value of the first alternative color and the gray-scale value of the second alternative color, and in this case, after the target pixel value of the pixel point is determined as the pixel value for the third alternative color, the trend of the size relation of the gray-scale value still exists between the gray-scale values of the n pixel points.

For example, the first alternative color is black, the second alternative color is white, and the third alternative color is red. In this case, the smallest gray-scale value of black is zero, and the largest gray-scale value of white is 255. The red gray-scale value is located between the black gray-scale value and the white gray-scale value, which is 85. The gray-scale values of the n sample pixel points in the target pixel sample have the trend of the size relation of the gray-scale values, in the case that an initial pixel value of a certain pixel point meets the pixel condition of the third alternative color, it indicates that the gray-scale value of the pixel point is located between the gray-scale value of black and the gray-scale value of white, and in this case, after the target pixel value of the pixel point is determined as red, the trend of the size relation of the gray-scale values still exists between the gray-scale values of the n pixel points.

The pixel condition of the third alternative color is set in advance. Moreover, the pixel condition of the third alternative color is also adjusted according to different requirements. In practice, the third alternative color includes only the third alternative color, and also includes other colors similar to the third alternative color. For example, the first alternative color is black, the second alternative color is white, and the third alternative color is red, only red is classified as red, and other colors are classified as black or white. Alternatively, red and orange close to red are classified as red, and other colors are classified as black or white. Alternatively, red and pink close to red are classified into red, and the other colors are classified into black or white.

The pixel conditions of the third alternative color are different when different colors are classified as red. For example, in the case that red and orange close to red are classified as red, the pixel condition of the third alternative color is (R≥G&&R≥B&&G≥B&&G−B<200&&R−G>15), and in the case that red and pink close to red are classified as red, the pixel condition of the third alternative color is (R≥ G&&R≥B&&B≥G&&B−G<50&&R−G>50).

In step 104, the initial pixel values of the n pixel points in the first image are converted into corresponding target pixel values.

After determining the target pixel value of each of the n pixel points in the first image according to the above method, the mobile terminal inputs the target pixel values of the n pixel points into a DrawRect function to acquire a data stream output by the DrawRect function, wherein the data stream corresponds to the target color of the n pixel points.

The mobile terminal determines the target pixel values of all pixel points in the first image and converts initial pixel values of all pixel points in the first image into corresponding target pixel values, or only determines initial pixel values of some pixel points in the first image, and converts the initial pixel values of some pixel points in the first image into corresponding target pixel values. In the case that the mobile terminal converts the initial pixel values of all pixel points in the first image into the corresponding target pixel values, the initial pixel values of each of the n pixel points in the first image are sequentially converted according to steps 101 to 104. In this case, after the mobile terminal traverses the n pixel points, the initial pixel values of the n pixel points need to be converted into corresponding target pixel values. Then, whether a traversal of all the pixel points in the first image is finished or not is determined, and the second image is output in the case that the traversal of all the pixel points in the first image is finished. In the case that all the pixel points in the first image are not traversed, the target pixel values of the remaining n pixel points that are not traversed in the first image are determined continuously according to steps 101 to 104 until all the pixel points in the first image are traversed, and then the second image is output. That is, the first image includes a plurality of groups of pixel points, each group of pixel points includes the n pixel points, and the second image is acquired after the initial pixel value of each of the pixel points in the plurality of groups of pixel points in the first image is converted into the corresponding target pixel value.

Implementation manners of the mobile terminal for determining whether the traversal of all the pixel points in the first image is finished are various. For example, based on the above description, a position coordinate of each of the pixel points in the first image is based on the pixel point, and in the case that there is a pixel point whose position coordinate is equal to the pixel width and the pixel height of the first image among the currently traversed n pixel points, it indicates that the currently traversed n pixel points are the last n pixel points in the first image to be processed. That is, the first image traversal is ended, and the mobile terminal outputs the second image. For another example, in the case that the number of traversed times of the mobile terminal is equal to the total number of traversed times of the first image when the mobile terminal traverses to the current n pixel points, it indicates that the current n pixel points are the last n pixel points in the first image to be processed. That is, the first image traversal is ended, and the mobile terminal outputs the second image.

The total number of traversals of the first image is determined based on the pixel width of the first image and the value of the n, and is also determined based on the pixel height of the first image and the value of the n. In addition, the total number of traversals of the first image is also determined in other manners, which is not limited in the embodiments of the present disclosure. Assuming that the pixel width of the first image is 800 pixels, and n is four, two pixel points are horizontally taken in each traversal. In this case, the total number of traversals of the first image is 400.

Figure 5:
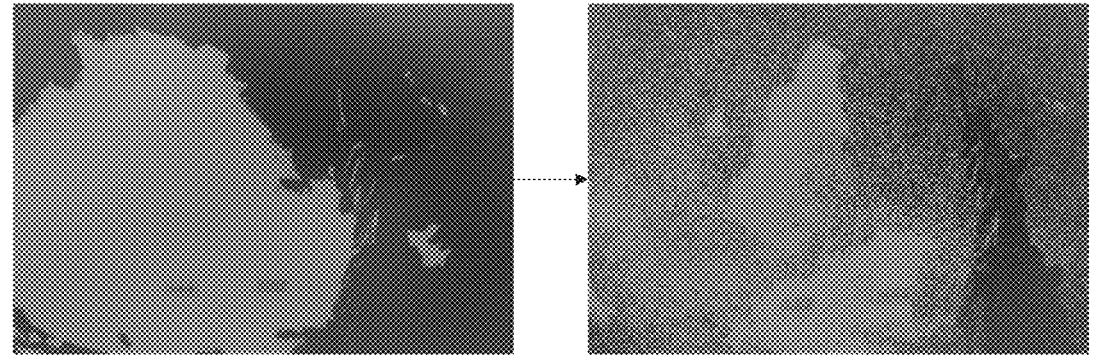
FIG. 5 is a schematic diagram of an image converting result according to some embodiments of the present disclosure.

Exemplarily, referring to FIG. 5, FIG. 5 is a schematic diagram of an image converting result according to some embodiments of the present disclosure. In FIG. 5, a left diagram is a diagram acquired by conversion after determining the target pixel value of each of the pixel points in the first image by other methods, and a right diagram is a diagram acquired by conversion after determining the target pixel value of each of the pixel points in the first image by the method provided in the present disclosure. Comparing the left diagram and the right diagram in FIG. 5, it is seen that the method provided by the embodiments of the present disclosure eliminates some boundary problems of the first image by determining the target pixel values of the n adjacent pixel points in the first image.

It should be noted that the number of the pixel points in the first image is not necessarily an integer multiple of the n, that is, after the target pixel value is determined according to the method by taking the n pixel points as a whole, there also exists some pixel points at an edge of the first image that cannot constitute the n pixel points, and these pixel points determine the corresponding target pixel values according to other methods, which is not limited in the embodiments of the present disclosure.

In the embodiments of the present disclosure, as the gray-scale trend of the n sample pixel points in the target pixel sample is the same as the gray-scale trend of the n adjacent pixel points in the first image to be processed, the gray between the target pixel values of the n sample pixel points determined based on the gray-scale trend of the n sample pixel points presents a certain trend. In this way, a boundary problem of the n pixel points in the second image is improved, and the second image presents a gradual change effect visually.

Figure 6:
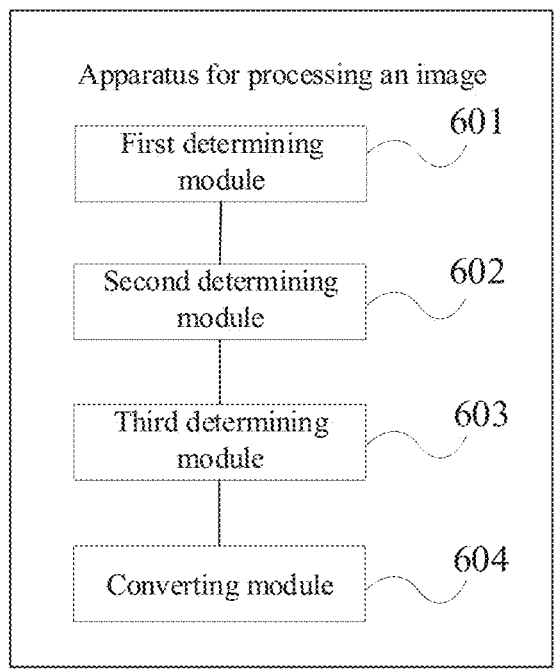
FIG. 6 is a schematic structural diagram of an apparatus for processing an image according to some embodiments of the present disclosure.

FIG. 6 is a schematic structural diagram of an apparatus for processing an image according to some embodiments of the present disclosure. The apparatus for processing the image is achieved as some or all of a device for processing an image by software, hardware, or a combination of the software and the hardware. Referring to FIG. 6, the apparatus for processing the image includes a first determining module 601, a second determining module 602, a third determining module 603, and a converting module 604.

The first determining module 601 is configured to determine, based on an average gray-scale value of n adjacent pixel points in a first image to be processed, a target pixel sample group from a plurality of pixel sample groups, wherein each of the plurality of pixel sample groups includes at least one pixel sample, each of pixel samples includes n sample pixel points, average gray-scale values of pixel samples in different pixel sample groups are different, and average gray-scale values of pixel samples in one pixel sample group are the same. For the detailed implementation process, reference is made to corresponding contents in the above embodiments, which is not described herein again.

The second determining module 602 is configured to determine, based on a gray-scale value of each of the n pixel points, a target pixel sample from at least one pixel sample in the target pixel sample group, wherein a gray-scale trend of n sample pixel points in the target pixel sample is a same as a gray-scale trend of the n pixel points. For the detailed implementation process, reference is made to corresponding contents in the above embodiments, which is not described herein again.

The third determining module 603 is configured to determine, based on the target pixel sample and initial pixel values of the n pixel points, target pixel values of the n pixel points from pixel values corresponding to a plurality of alternative colors. For the detailed implementation process, reference is made to corresponding contents in the above embodiments, which is not described herein again.

The converting module 604 is configured to convert the initial pixel values of the n pixel points in the first image into corresponding target pixel values. For the detailed implementation process, reference is made to corresponding contents in the above embodiments, which is not described herein again.

In some embodiments, the first determining module 601 is specifically configured to:

determine, from a plurality of average gray-scale ranges, a target average gray-scale range where the average gray-scale value of the n pixel points is located, wherein the plurality of average gray-scale ranges are composed of average gray-scale values corresponding to the plurality of pixel sample groups; and determine a pixel sample group corresponding to a lower limit of the target average gray-scale range as the target pixel sample group.

In some embodiments, the first determining module 601 is specifically configured to:

determine a difference value between the average gray-scale value corresponding to each of pixel sample groups in the plurality of pixel sample groups and the average gray-scale value of the n pixel points; and determine a pixel sample group with the smallest difference value among the plurality of pixel sample groups as the target pixel sample group.

In some embodiments, the plurality of alternative colors include a first alternative color having no hue and a second alternative color having hue, a pixel value of each of the n sample pixel points is a pixel value of the first alternative color or the second alternative color, and each of the pixel samples in the target pixel sample group corresponds to a gray-scale trend label, wherein the gray-scale trend label is configured to indicate a gray-scale trend of the n sample pixel points in the pixel sample; and the second determining module 602 is specifically configured to:

acquire a sorting result by sorting the n pixel points according to a size relation of the gray-scale values of the n pixel points;

determine, based on a first number and a second number corresponding to the target pixel sample group, a gray-scale trend label of the n pixel points according to the sorting result, wherein the first number is a number of sample pixel points of the first alternative color among the n sample pixel points, and the second number is a number of sample pixel points of the second alternative color among the n sample pixel points; and determine, from the at least one pixel sample in the target pixel sample group, a pixel sample with a gray-scale trend label same as the gray-scale trend label of the n pixel points as the target pixel sample.

In some embodiments, the plurality of alternative colors include a first alternative color having no hue and a second alternative color having no hue, and the pixel value of each of the n sample pixel points is the pixel value of the first alternative color or the second alternative color; and the second determining module 602 is specifically configured to:

acquire a sorting result by sorting the n pixel points according to a size relation of the gray-scale values of the n pixel points;

determine, based on a first number and a second number corresponding to the target pixel sample group, a color of each of the n pixel points as the first alternative color or the second alternative color according to the sorting result, wherein the first number is a number of sample pixel points of the first alternative color among the n sample pixel points, and the second number is a number of sample pixel points of the second alternative color among the n sample pixel points; and determine the target pixel sample from the at least one pixel sample in the target pixel sample group according to a color determining result of the n pixel points.

In some embodiments, the plurality of alternative colors further includes a third alternative color having a hue; and the third determining module 603 is specifically configured to:

determine, for any one of the n pixel points, whether an initial pixel value of the pixel point meets a pixel condition of the third alternative color;

determine, in a case that the initial pixel value of the pixel point meets the pixel condition of the third alternative color, the pixel value corresponding to the third alternative color as a target pixel value of the pixel point;

determine, in a case that the initial pixel value of the pixel point does not meet the pixel condition of the third alternative color, a pixel value of a sample pixel point at a corresponding position of the pixel point in the target pixel sample as a target pixel value of the pixel point.

In some embodiments, the first image includes a plurality of groups of pixel points, each group of pixel points includes n pixel points, and the apparatus further includes:

an acquiring module, configured to acquire a second image, wherein the second image includes the plurality of groups of pixel points, and an initial pixel value of each pixel point in the plurality of groups of pixel points in the first image is converted into a corresponding target pixel value.

In some embodiments, the n is four.

In the embodiments of the present disclosure, as the gray-scale trend of the n sample pixel points in the target pixel sample is the same as the gray-scale trend of the n adjacent pixel points in the first image to be processed, the gray between the target pixel values of the n sample pixel points determined based on the gray-scale trend of the n sample pixel points presents a certain trend. In this way, a boundary problem of the n pixel points in the second image is improved, and the second image presents a gradual change effect visually.

It should be noted that, in the case that the apparatus for processing the image according to the above embodiments performs image processing, the division of the functional modules is merely exemplary. In practice, the above functions can be assigned to different functional modules according to needs, that is, the internal structure of the apparatus is divided into different functional modules, to implement all or a part of the above functions. In addition, the apparatus and the method for processing the image according to the above embodiments belong to the same concept, and specific implementation processes thereof are described in the method embodiments in detail, and are not repeated herein.

Figure 7:
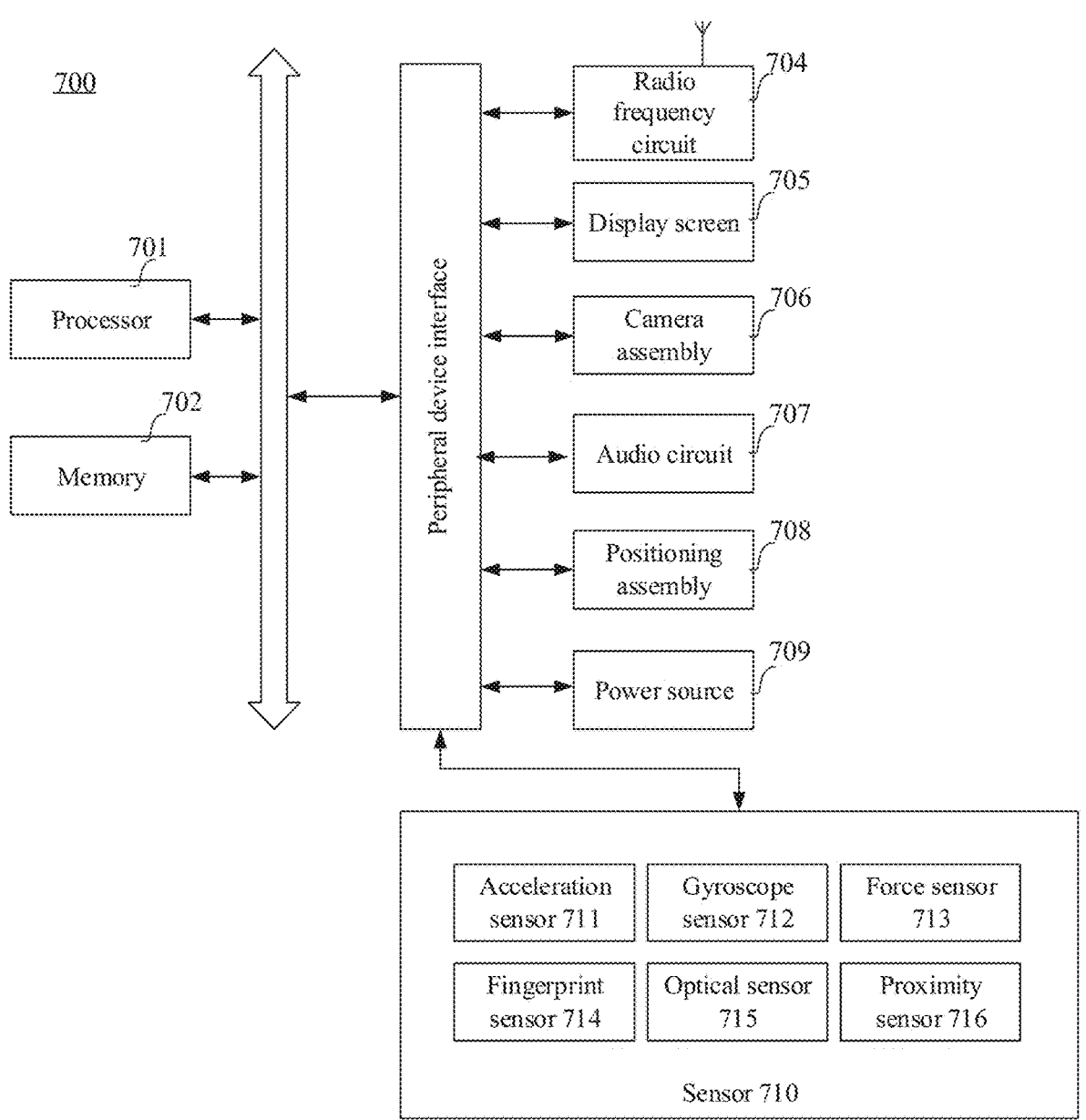
FIG. 7 is a schematic structural diagram of a mobile terminal according to some embodiments of the present disclosure.

FIG. 7 shows a structural block diagram of a mobile terminal 700 according to some embodiments of the present disclosure. The mobile terminal 700 may be a portable mobile terminal, such as a smart phone, a tablet computer, a moving picture experts group audio layer III (MP3) player, a moving picture experts group audio layer IV (MP4) player, a notebook computer, or a desktop computer. The mobile terminal 700 is also referred to as user equipment, a portable terminal, a laptop terminal, a desktop terminal, or the like.

Generally, the mobile terminal 700 includes a processor 701 and a memory 702.

The processor 701 includes one or more processing cores, such as a 4-core processor and an 8-core processor. The processor 701 is implemented by at least one of hardware forms of a digital signal processor (DSP), a field-programmable gate array (FPGA), and a programmable logic array (PLA). The processor 701 also includes a main processor and a coprocessor. The main processor is a processor for processing data in an awake state, and is also referred to as a central processing unit (CPU). The coprocessor is a low-power-consumption processor for processing the data in a standby state. In some embodiments, the processor 701 is integrated with a graphics processing unit (GPU), which is configured to render and draw the content that needs to be displayed on a display screen. In some embodiments, the processor 701 further includes an artificial intelligence (AI) processor for processing computational operations related to machine learning.

The memory 702 includes one or more computer-readable storage media, which is non-transitory. The memory 702 further includes a high-speed random access memory, as well as a non-volatile memory, such as one or more magnetic disk storage devices and flash storage devices. In some embodiments, a non-transitory computer-readable storage medium in the memory 702 is configured to store at least one instruction. The at least one instruction is configured to be executed by the processor 701 to perform the method for processing the image in the embodiments of the present disclosure.

In some embodiments, the mobile terminal 700 further optionally includes a peripheral device interface 703 and at least one peripheral device. The processor 701, the memory 702, and the peripheral device interface 703 are connected via buses or signal lines. Each peripheral device is connected to the peripheral device interface 703 via a bus, signal line, or a circuit board. In some embodiments, the peripheral devices include at least one of a radio frequency circuit 704, a display screen 705, a camera assembly 706, an audio circuit 707, a positioning assembly 708, and a power source 709.

The peripheral device interface 703 is configured to connect at least one peripheral device associated with an input/output (I/O) to the processor 701 and the memory 702. In some embodiments, the processor 701, the memory 702, and the peripheral device interface 703 are integrated on the same chip or circuit board. In some other embodiments, any one or two of the processor 701, the memory 702, and the peripheral device interface 703 are implemented on a separate chip or circuit board, which is not limited in the embodiments of the present disclosure.

The radio frequency circuit 704 is configured to receive and transmit a radio frequency (RF) signal, which is also referred to as an electromagnetic signal. The radio frequency circuit 704 is communicated with a communication network and other communication devices via electromagnetic signals. The radio frequency circuit 704 converts an electrical signal into an electromagnetic signal for transmission or converts the received electromagnetic signal into an electrical signal. In some embodiments, the radio frequency circuit 704 includes an antenna system, an RF transceiver, one or more amplifiers, a tuner, an oscillator, a digital signal processor, a coder/decoder (codec) chipset, a subscriber identity module card, and the like. The radio frequency circuit 704 is communicated with other terminals via at least one wireless communication protocol. The wireless communication protocol includes, but is not limited to, WWW network, a metropolitan area network, intranet, various generations of mobile communication networks (2G, 3G, 4G, and 5G), a wireless local area network, and/or a wireless fidelity (Wi-Fi) network. In some embodiments, the radio frequency circuit 704 further includes a near-field communication (NFC) related circuit, which is not limited in the embodiments of the present disclosure.

The display screen 705 is configured to display a user interface (UI). The UI includes graphics, text, icons, videos, and any combination thereof. In the case that the display screen 705 is a touch display screen, the display screen 705 also has the capacity to acquire a touch signal on or over a surface of the display screen 705. The touch signal is input to the processor 701 as a control signal for processing. In this case, the display screen 705 is also configured to provide virtual buttons and/or virtual keyboards, which are also referred to as soft buttons and/or soft keyboards. In some embodiments, there is one display screen 705 disposed on a front panel of the mobile terminal 700; in some other embodiments, there are at least two display screens 705 disposed on different surfaces of the mobile terminal 700 respectively or in a folded design. In some other embodiments, the display screen 705 is a flexible display screen disposed on a curved surface or a folded surface of the mobile terminal 700. Moreover, the display screen 705 may have an irregular shape other than a rectangle, that is, an irregular-shaped screen. The display screen 705 is prepared by using a material such as a liquid crystal display (LCD) or an organic light-emitting diode (OLED).

The camera assembly 706 is configured to capture images or videos. Optionally, the camera assembly 706 includes a front camera and a rear camera. Generally, the front camera is disposed on the front panel of the terminal and the rear camera is disposed on a back side of the terminal. In some embodiments, there are at least two rear cameras, and each of the at least two rear cameras is any one of a main camera, a depth-of-field camera, a wide-angle camera, and a tele-photo camera, to realize a background blurring function realized by fusion of the main camera and the depth-of-field camera, panoramic shooting and virtual reality (VR) shooting functions by fusion of the main camera and the wide-angle camera, or other fusion shooting functions. In some embodiments, the camera assembly 706 further includes a flashlight. The flashlight is a mono-color temperature flash-light or a two-color temperature flashlight. The two-color temperature flashlight is a combination of a warm flashlight and a cold flashlight, and can be used for light compensation at different color temperatures.

The audio circuit 707 includes a microphone and a loudspeaker. The microphone is configured to acquire sound waves of users and the environment, and convert the sound waves into electrical signals which are input into the processor 701 for processing, or input into the radio frequency circuit 704 for voice communication. For stereo acquisition or noise reduction, there are a plurality of microphones, which are respectively disposed at different parts of the mobile terminal 700. The microphone is also an array microphone or an omnidirectional acquisition microphone. The loudspeaker is configured to convert the electrical signal from the processor 701 or the radio frequency circuit 704 into the sound waves. The loudspeaker is a conventional film loudspeaker or a piezoelectric ceramic loudspeaker. In the case that the loudspeaker is the piezoelectric ceramic speaker, the electrical signals can be converted into not only human-audible sound waves but also the sound waves which are inaudible to humans for ranging and the like. In some embodiments, the audio circuit 707 further includes a head-phone jack.

The positioning assembly 708 is configured to locate a current geographic location of the mobile terminal 700 to implement navigation or a location-based service (LBS). The positioning assembly 708 is the United States' Global Positioning System (GPS), Russia's Global Navigation Satellite System (GLONASS), China's BeiDou Navigation Satellite System (BDS), and the European Union's Galileo Satellite Navigation System (Galileo).

The power source 709 is configured to supply power for various components in the mobile terminal 700. The power source 709 is an alternating current, a direct current, a disposable battery, or a rechargeable battery. In the case that the power source 709 includes the rechargeable battery, the rechargeable battery is a wired charging battery or a wireless charging battery. The wired charging battery is a battery that is charged through a wired line, and a wireless charging battery is a battery that is charged through a wireless coil. The rechargeable battery also supports the fast-charging technology.

In some embodiments, the mobile terminal 700 further includes one or more sensors 710. The one or more sensors 710 include, but are not limited to, an acceleration sensor 711, a gyroscope sensor 712, a force sensor 713, a fingerprint sensor 714, an optical sensor 715, and a proximity sensor 716.

The acceleration sensor 711 is configured to detect magnitudes of accelerations on three coordinate axes of a coordinate system established by the mobile terminal 700. For example, the acceleration sensor 711 is configured to detect components of gravitational acceleration on the three coordinate axes. The processor 701 controls the display screen 705 to display a user interface in a landscape view or a portrait view based on a gravity acceleration signal acquired by the acceleration sensor 711. The acceleration sensor 711 is also configured to acquire motion data of a game or a user.

The gyroscope sensor 712 is configured to detect a body direction and a rotation angle of the mobile terminal 700, and cooperates with the acceleration sensor 711 to acquire a 3D motion of the user on the mobile terminal 700. Based on the data acquired by the gyroscope sensor 712, the processor 701 achieves the following functions: motion sensing (for example, changing the UI according to a user's tilting operation), image stabilization during shooting, game control, and inertial navigation.

The force sensor 713 is disposed at a side frame of the mobile terminal 700 and/or a lower layer of the display screen 705. In the case that the force sensor 713 is disposed on the side frame of the mobile terminal 700, a user's holding signal to the mobile terminal 700 can be detected, and the processor 701 can perform left-right hand recognition or quick operation according to the holding signal acquired by the force sensor 713. In the case that the force sensor 713 is disposed on the lower layer of the display screen 705, the processor 701 controls an operability control on the UI based on a user's press operation on the display screen 705. The operability control includes at least one of a button control, a scroll bar control, an icon control, and a menu control.

The fingerprint sensor 714 is configured to acquire a user's fingerprint, and the processor 701 identifies the user's identity based on the fingerprint acquired by the fingerprint sensor 714, or the fingerprint sensor 714 identifies the user's identity based on the acquired fingerprint. In the case that the user's identity is identified as trusted, the processor 701 authorizes the user to perform related sensitive operations, such as unlocking the screen, viewing encrypted information, downloading software, paying, and changing settings. The fingerprint sensor 714 is disposed on the front side, back side, or side surface of the mobile terminal 700. In the case that a physical key or a manufacturer's logo is provided on the mobile terminal 700, the fingerprint sensor 714 is integrated with the physical key or the manufacturer's logo.

The optical sensor 715 is configured to acquire ambient light intensity. In some embodiments, the processor 701 controls the display brightness of the display screen 705 based on the ambient light intensity acquired by the optical sensor 715. In some embodiments, in the case that the ambient light intensity is higher, the display brightness of the display screen 705 is increased; and in the case that the ambient light intensity is lower, the display brightness of the display screen 705 is decreased. In another embodiment, the processor 701 also dynamically adjusts the shooting parameters of the camera assembly 706 based on the ambient light intensity acquired by the optical sensor 715.

The proximity sensor 716, also referred to as a distance sensor, is usually disposed on the front panel of the mobile terminal 700. The proximity sensor 716 is configured to acquire a distance between the user and the front side of the mobile terminal 700. In some embodiments, in the case that the proximity sensor 716 detects that the distance between the user and the front side of the mobile terminal 700 is gradually decreasing, the processor 701 controls the display screen 705 to switch from a screen-on state to a screen-off state; and in the case that the proximity sensor 716 detects that the distance between the user and the front side of the mobile terminal 700 is gradually increasing, the processor 701 controls the display screen 705 to switch from the screen-off state into the screen-on state.

Those skilled in the art can appreciate that the structure illustrated in FIG. 7 does not constitute limitation of the mobile terminal 700, and that more or fewer components than those illustrated are included, or some of the components are combined, or a different arrangement of components is employed.

In some embodiments, a non-transitory computer-readable storage medium having a computer program stored herein is further provided. The computer program, when executed by a processor, causes the processor to perform the method for processing the image in the above embodiments. For example, the computer-readable storage medium is a ROM, a RAM, a CD-ROM, a magnetic tape, a soft disk, an optical data storage device, and the like.

It is noted that the computer-readable storage medium according to the embodiments of the present disclosure is a non-volatile storage medium, in other words, a non-transitory storage medium.

It should be understood that all or part of the steps to achieve the above embodiments are achieved by software, hardware, firmware, or any combination thereof. In the case that it is achieved in software, it is achieved in whole or in part in the form of a computer program product. The computer program product includes one or more computer instructions. The computer instructions are stored in the above computer-readable storage medium.

That is, in some embodiments, a computer program product including one or more instructions is further provided. The one or more instructions, when executed by a computer, cause the computer to perform the method for processing the image described above.

It is understood that the term "at least one" refers to one or more, and "a plurality of" refers to two or more. In the description of the embodiments of the present disclosure, "/" indicates an alternative meaning, for example, A/B indicates A or B; "and/or" herein is only an association relationship that describes the associated objects, and indicates that there are three relationships. For example, A and/or B may indicate that: only A is present, both A and B are present, and only B is present. In addition, to facilitate a clear description of technical solutions of the embodiments of the present disclosure, in the embodiments of the present disclosure, words such as "first" and "second" are adopted to distinguish identical items or similar items with substantially identical functions and actions. Those skilled in the art are appreciated that the terms "first", "second", and the like do not limit quantity and execution order, but rather the terms "first", "second", and the like do not limit that they are not necessarily different.

Described above are the embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A method for processing an image, applied in a terminal device and comprising:

determining, based on an average gray-scale value of n adjacent pixel points in a first image to be processed, a target pixel sample group from a plurality of pixel sample groups, wherein each of the plurality of pixel sample groups comprises at least one pixel sample, each pixel sample comprises n sample pixel points, average gray-scale values of pixel samples in different pixel sample groups are different, and average gray-scale values of pixel samples in one pixel sample group are the same;

determining, based on a gray-scale value of each of the n pixel points, a target pixel sample from at least one pixel sample in the target pixel sample group, wherein a gray-scale trend of n sample pixel points in the target pixel sample is the same as a gray-scale trend of the n pixel points;

determining, based on the target pixel sample and initial pixel values of the n pixel points, target pixel values of the n pixel points from pixel values corresponding to a plurality of alternative colors; and obtaining a second image by converting the initial pixel values of the n pixel points in the first image into corresponding target pixel values, wherein the second image presents a gradual change effect visually, wherein said determining, based on the average gray-scale value of the n adjacent pixel points in the first image to be processed, the target pixel sample group from the plurality of pixel sample groups comprises: determining, from a plurality of average gray-scale ranges, a target average gray-scale range where the average gray-scale value of the n pixel points is located, wherein the plurality of average gray-scale ranges are composed of average gray-scale values corresponding to the plurality of pixel sample groups; and determining a pixel sample group corresponding to a lower limit of the target average gray-scale range as the target pixel sample group;

the plurality of alternative colors comprise a first alternative color having no hue, a second alternative color having no hue, and a third alternative color having a hue; and said determining, based on the target pixel sample and the initial pixel values of the n pixel points, the target pixel values of the n pixel points from pixel values corresponding to the plurality of alternative colors comprises: determining, for any one of the n pixel points, whether an initial pixel value of the pixel point meets a pixel condition of the third alternative color; determining, in a case that the initial pixel value of the pixel point meets the pixel condition of the third alternative color, a pixel value corresponding to the third alternative color as a target pixel value of the pixel point; and determining, in a case that the initial pixel value of the pixel point does not meet the pixel condition of the third alternative color, a pixel value of a sample pixel point at a corresponding position of the pixel point in the target pixel sample as the target pixel value of the pixel point.

2. The method for processing the image according to claim 1, wherein said determining, based on the average gray-scale value of the n adjacent pixel points in the first image to be processed, the target pixel sample group from the plurality of pixel sample groups comprises:

determining a difference value between an average gray-scale value corresponding to each of the plurality of pixel sample groups and the average gray-scale value of the n pixel points; and determining a pixel sample group with a smallest difference value among the plurality of pixel sample groups as the target pixel sample group.

3. The method for processing the image according to claim 1, wherein a pixel value of each of the n sample pixel points is a pixel value of the first alternative color or the second alternative color, and each of the pixel samples in the target pixel sample group corresponds to a gray-scale trend label, wherein the gray-scale trend label is configured to indicate a gray-scale trend of the n sample pixel points in the pixel sample; and said determining, based on the gray-scale value of each of the n pixel points, the target pixel sample from the at least one pixel sample in the target pixel sample group comprises:

acquiring a sorting result by sorting the n pixel points according to a size relation of the gray-scale values of the n pixel points;

determining, based on a first number and a second number corresponding to the target pixel sample group, a gray-scale trend label of the n pixel points according to the sorting result, wherein the first number is a number of sample pixel points of the first alternative color among the n sample pixel points, and the second number is a number of sample pixel points of the second alternative color among the n sample pixel points; and determining, from the at least one pixel sample in the target pixel sample group, a pixel sample with a gray-scale trend label same as the gray-scale trend label of the n pixel points as the target pixel sample.

4. The method for processing the image according to claim 1, wherein the pixel value of each of the n sample pixel points is a pixel value of the first alternative color or the second alternative color; and said determining, based on the gray-scale value of each of the n pixel points, the target pixel sample from the at least one pixel sample in the target pixel sample group comprises:

acquiring a sorting result by sorting the n pixel points according to a size relation of the gray-scale values of the n pixel points;

determining, based on a first number and a second number corresponding to the target pixel sample group, a color of each of the n pixel points as the first alternative color or the second alternative color according to the sorting result, wherein the first number is a number of sample pixel points of the first alternative color among the n sample pixel points, and the second number is a number of sample pixel points of the second alternative color among the n sample pixel points; and determining the target pixel sample from the at least one pixel sample in the target pixel sample group according to a color determining result of the n pixel points.

5. The method for processing the image according to claim 1, wherein the first image comprises a plurality of groups of pixel points, each group of pixel points comprises n pixel points, and the method further comprises:

acquiring a second image, wherein the second image comprises the plurality of groups of pixel points, and an initial pixel value of each of the pixel points in the plurality of groups of pixel points in the first image is converted into a corresponding target pixel value.

6. The method for processing the image according to claim 1, wherein the n is four.

7. An apparatus for processing an image, applied in a terminal device and comprising:

a processor; and a memory configured to store one or more instructions executable by the processor;

wherein the processor, when loading and executing the one or more instructions, is caused to perform:

determining, based on an average gray-scale value of n adjacent pixel points in a first image to be processed, a target pixel sample group from a plurality of pixel sample groups, wherein each of the plurality of pixel sample groups comprises at least one pixel sample, each pixel sample comprises n sample pixel points, average gray-scale values of pixel samples in different pixel sample groups are different, and average gray-scale values of pixel samples in one pixel sample group are the same;

determining, based on a gray-scale value of each of the n pixel points, a target pixel sample from at least one pixel sample in the target pixel sample group, wherein a gray-scale trend of n sample pixel points in the target pixel sample is the same as a gray-scale trend of the n pixel points;

determining, based on the target pixel sample and initial pixel values of the n pixel points, target pixel values of the n pixel points from pixel values corresponding to a plurality of alternative colors; and obtaining a second image by converting the initial pixel values of the n pixel points in the first image into corresponding target pixel values, wherein the second image presents a gradual change effect visually, wherein said determining, based on the average gray-scale value of the n adjacent pixel points in the first image to be processed, the target pixel sample group from the plurality of pixel sample groups comprises: determining, from a plurality of average gray-scale ranges, a target average gray-scale range where the average gray-scale value of the n pixel points is located, wherein the plurality of average gray-scale ranges are composed of average gray-scale values corresponding to the plurality of pixel sample groups; and determining a pixel sample group corresponding to a lower limit of the target average gray-scale range as the target pixel sample group;

the plurality of alternative colors comprise a first alternative color having no hue, a second alternative color having no hue, and a third alternative color having a hue; and said determining, based on the target pixel sample and the initial pixel values of the n pixel points, the target pixel values of the n pixel points from pixel values corresponding to the plurality of alternative colors comprises: determining, for any one of the n pixel points, whether an initial pixel value of the pixel point meets a pixel condition of the third alternative color; determining, in a case that the initial pixel value of the pixel point meets the pixel condition of the third alternative color, a pixel value corresponding to the third alternative color as a target pixel value of the pixel point; and determining, in a case that the initial pixel value of the pixel point does not meet the pixel condition of the third alternative color, a pixel value of a sample pixel point at a corresponding position of the pixel point in the target pixel sample as the target pixel value of the pixel point.

8. A device for processing an image, applied in a terminal device and comprising a memory and a processor, wherein the memory is configured to store a computer program, and the processor is configured to execute the computer program stored in the memory to perform:

determining, based on an average gray-scale value of n adjacent pixel points in a first image to be processed, a target pixel sample group from a plurality of pixel sample groups, wherein each of the plurality of pixel sample groups comprises at least one pixel sample, each pixel sample comprises n sample pixel points, average gray-scale values of pixel samples in different pixel sample groups are different, and average gray-scale values of pixel samples in one pixel sample group are the same;

determining, based on a gray-scale value of each of the n pixel points, a target pixel sample from at least one pixel sample in the target pixel sample group, wherein a gray-scale trend of n sample pixel points in the target pixel sample is the same as a gray-scale trend of the n pixel points;

determining, based on the target pixel sample and initial pixel values of the n pixel points, target pixel values of the n pixel points from pixel values corresponding to a plurality of alternative colors; and obtaining a second image by converting the initial pixel values of the n pixel points in the first image into corresponding target pixel values, wherein the second image presents a gradual change effect visually, wherein said determining, based on the average gray-scale value of the n adjacent pixel points in the first image to be processed, the target pixel sample group from the plurality of pixel sample groups comprises: determining, from a plurality of average gray-scale ranges, a target average gray-scale range where the average gray-scale value of the n pixel points is located, wherein the plurality of average gray-scale ranges are composed of average gray-scale values corresponding to the plurality of pixel sample groups; and determining a pixel sample group corresponding to a lower limit of the target average gray-scale range as the target pixel sample group;

the plurality of alternative colors comprise a first alternative color having no hue, a second alternative color having no hue, and a third alternative color having a hue; and said determining, based on the target pixel sample and the initial pixel values of the n pixel points, the target pixel values of the n pixel points from pixel values corresponding to the plurality of alternative colors comprises: determining, for any one of the n pixel points, whether an initial pixel value of the pixel point meets a pixel condition of the third alternative color; determining, in a case that the initial pixel value of the pixel point meets the pixel condition of the third alternative color, a pixel value corresponding to the third alternative color as a target pixel value of the pixel point; and determining, in a case that the initial pixel value of the pixel point does not meet the pixel condition of the third alternative color, a pixel value of a sample pixel point at a corresponding position of the pixel point in the target pixel sample as the target pixel value of the pixel point.

9. A non-transitory computer-readable storage medium storing a computer program, wherein the computer program, when executed by a processor, causes the processor to perform the method for processing the image as defined in claim 1.

10. The apparatus for processing the image according to claim 7, wherein the processor, when loading and executing the one or more instructions, is caused to perform:

determining a difference value between an average gray-scale value corresponding to each of the plurality of pixel sample groups and the average gray-scale value of the n pixel points; and determining a pixel sample group with a smallest difference value among the plurality of pixel sample groups as the target pixel sample group.

11. The apparatus for processing the image according to claim 7, wherein a pixel value of each of the n sample pixel points is a pixel value of the first alternative color or the second alternative color, and each of the pixel samples in the target pixel sample group corresponds to a gray-scale trend label, wherein the gray-scale trend label is configured to indicate a gray-scale trend of the n sample pixel points in the pixel sample; and the processor, when loading and executing the one or more instructions, is caused to perform:

acquiring a sorting result by sorting the n pixel points according to a size relation of the gray-scale values of the n pixel points;

determining, based on a first number and a second number corresponding to the target pixel sample group, a gray-scale trend label of the n pixel points according to the sorting result, wherein the first number is a number of sample pixel points of the first alternative color among the n sample pixel points, and the second number is a number of sample pixel points of the second alternative color among the n sample pixel points; and determining, from the at least one pixel sample in the target pixel sample group, a pixel sample with a gray-scale trend label same as the gray-scale trend label of the n pixel points as the target pixel sample.

12. The apparatus for processing the image according to claim 7, wherein the pixel value of each of the n sample pixel points is a pixel value of the first alternative color or the second alternative color; and the processor, when loading and executing the one or more instructions, is caused to perform:

acquiring a sorting result by sorting the n pixel points according to a size relation of the gray-scale values of the n pixel points;

determining, based on a first number and a second number corresponding to the target pixel sample group, a color of each of the n pixel points as the first alternative color or the second alternative color according to the sorting result, wherein the first number is a number of sample pixel points of the first alternative color among the n sample pixel points, and the second number is a number of sample pixel points of the second alternative color among the n sample pixel points; and determining the target pixel sample from the at least one pixel sample in the target pixel sample group according to a color determining result of the n pixel points.

13. The apparatus for processing the image according to claim 7, wherein the first image comprises a plurality of groups of pixel points, each group of pixel points comprises n pixel points, and the processor, when loading and executing the one or more instructions, is caused to perform:

acquiring a second image, wherein the second image comprises the plurality of groups of pixel points, and an initial pixel value of each of the pixel points in the plurality of groups of pixel points in the first image is converted into a corresponding target pixel value.

14. The apparatus for processing the image according to claim 7, wherein the n is four.

* * * * *